United States Patent
Le Calve et al.

(10) Patent No.: US 6,189,671 B1
(45) Date of Patent: Feb. 20, 2001

(54) FREEWHEEL DEVICE WITH LATERAL BEARINGS

(75) Inventors: Marc Le Calve, Cerelles; Christophe Houdayer, Tours, both of (FR)

(73) Assignee: SKF France (FR)

( * ) Notice: Under 35 U.S.C. 154(b), the term of this patent shall be extended for 0 days.

(21) Appl. No.: 09/266,602

(22) Filed: Mar. 11, 1999

(30) Foreign Application Priority Data

Mar. 16, 1998 (FR) .................................................. 98 03187

(51) Int. Cl.$^7$ ...................................................... F16D 13/74
(52) U.S. Cl. ...................................................... 192/113.32
(58) Field of Search ............................. 192/113.32, 45.1, 192/41 A, 48.92

(56) References Cited

U.S. PATENT DOCUMENTS

| | | | |
|---|---|---|---|
| 2,834,445 | 5/1958 | Gorsky | 192/45.1 |
| 4,875,564 | 10/1989 | Leitz et al. | 192/45.1 |
| 4,913,271 | 4/1990 | Kinoshita et al. | 192/41 R |
| 5,320,204 | 6/1994 | Riggle et al. | 192/45.1 |
| 5,671,836 | 9/1997 | Shirataki et al. | 192/113.32 |

FOREIGN PATENT DOCUMENTS

| | | |
|---|---|---|
| 0240847 A2 | 10/1987 | (EP) . |
| 0370119 A1 | 5/1990 | (EP) . |
| 59-166729 | * 9/1984 | (JP) . |
| 8-93889 | * 4/1996 | (JP) . |

* cited by examiner

Primary Examiner—Charles A Marmor
Assistant Examiner—Ankur Parekh
(74) Attorney, Agent, or Firm—Smith, Gambrell & Russell, LLP

(57) ABSTRACT

Freewheel device 1 of the type comprising an outer ring 2 having an inner sliding path 3, an inner ring 4 or a shaft having an outer sliding path 5, a freewheel 6 disposed between the sliding path of the outer ring and the sliding path of the inner ring and comprising a plurality of cams 7 disposed in windows 9 in a cylindrical part 8a of at least one cage 8 and assuring unidirectional coupling between the outer and inner rings, and at least one bearing member 11 disposed radially between the outer and inner rings for maintaining said outer and inner rings concentric, said bearing member having a radial part 11a provided with at least two holes for circulation of lubricant. At least one hole is near the outer ring.

24 Claims, 2 Drawing Sheets

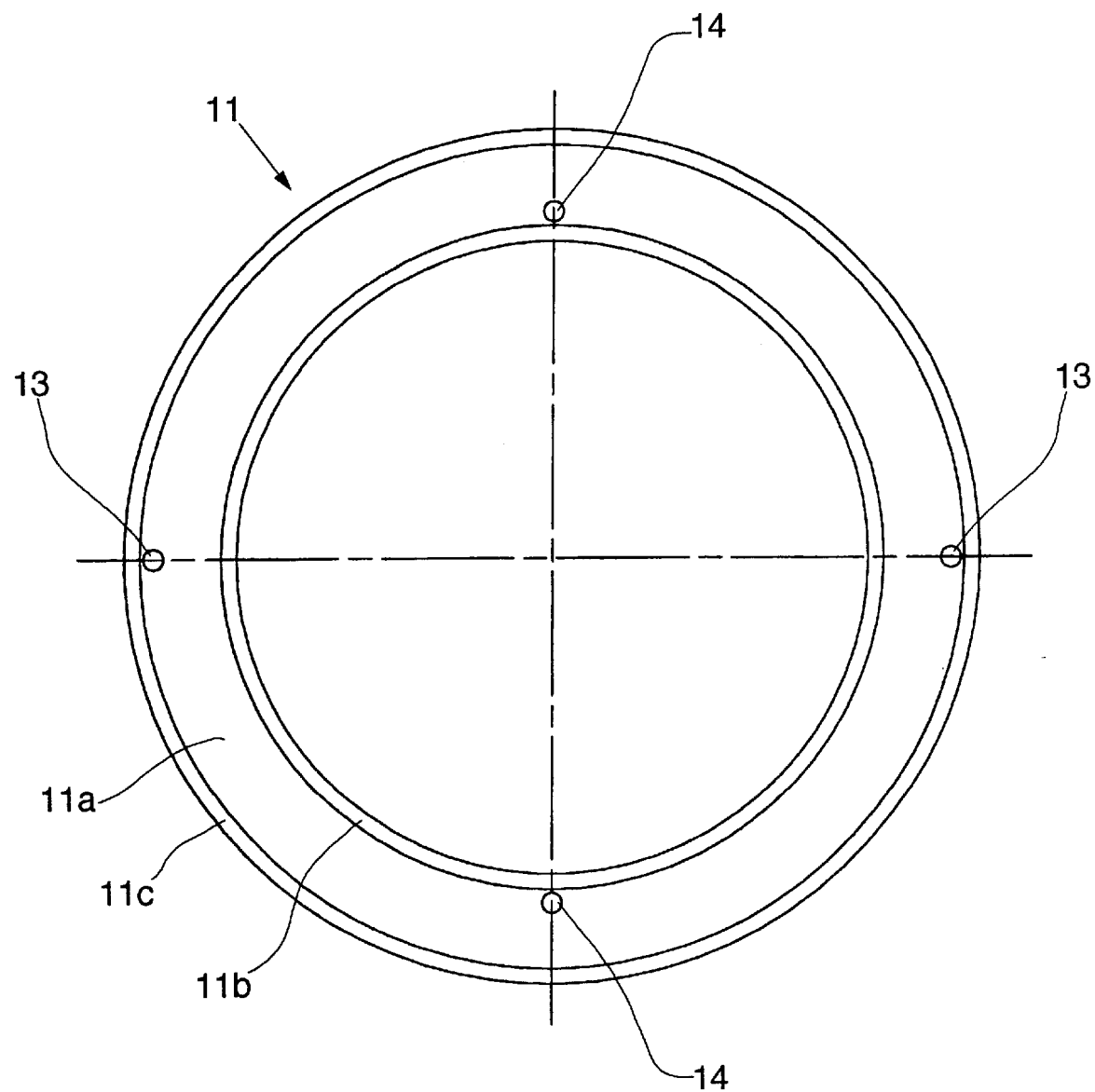

FREEWHEEL DEVICE WITH LATERAL BEARINGS

BACKGROUND OF THE INVENTION

The present invention concerns the field of freewheel devices used in automatic transmissions for motor vehicles, for example.

Freewheel devices generally comprise an outer ring with a cylindrical inner sliding path for cams of the freewheel, an inner ring or a shaft having a cylindrical outer sliding path for said cams of the freewheel, a freewheel between the sliding path of the outer ring and the sliding path of the inner ring or the shaft, and one or more bearing members for holding the inner and outer rings concentric and transmitting radial forces between said rings.

A bearing is a generally annular component having a radial part in the form of a substantially plane washer delimited by two circular edges to each of which an axial portion is joined. The axial portions bear on corresponding bearing surfaces of the rings, so centering the two rings relative to each other in the manner of smooth bearings. Said corresponding bearing surfaces of the rings can be an axial extension of the corresponding sliding paths.

The freewheel comprises a single cage or a double cage comprising two concentric cages with windows containing cams which, by becoming wedged between or sliding between the two sliding paths, assure unidirectional coupling between the inner and outer rings. The freewheel is able to transmit torque in one direction between the inner and outer rings and allows free rotation in the other direction.

To encourage tilting of the cams in the wedging direction a spring can be provided in the form of a strip applying to each cam a return torque urging it at all times into contact with the sliding paths.

The various components of the freewheel device can move relative to each other, rings relative to cams, cages relative to bearings, rings relative to bearings, or relative to adjoining components such as friction discs, retaining flanges, etc.

It is therefore necessary to lubricate these components to encourage sliding and to evacuate heat generated by friction.

Prior art documents, and in particular documents U.S. Pat. No. 4,875,564 and JP-A-326 866, describe lateral smooth bearings in freewheels and having in the middle of their disc-shape radial part lubricating holes through which the lubricant can be evacuated, which lubricant is generally injected under pressure into the assembly by means of a passage opening onto the path of the inner ring or the shaft.

This arrangement has certain drawbacks, however. Because the parts rotate, the lubricant tends to be centrifuged towards the outside of the sliding path on the outer ring. There is a volume radially between the lubricating holes of the bearings and the path of the outer ring in which the lubricant tends to stagnate with the result that it is not renewed or is not renewed properly. The lubricant circulates badly, heat is evacuated imperfectly and localized heating occurs in this area, which can further aggravate the phenomenon if the bearings are made of copper alloy.

The coefficient of thermal expansion of a copper alloy is higher than that of the steel constituting the other parts and in particular the rings. The bearings tend to bind on the outer ring and the small radial clearance between the bearing and the outer ring becomes insufficient to allow circulation of the lubricant. The phenomenon of stagnation of the lubricant is therefore aggravated and there is an increased risk of binding between the outside cylindrical bearing surfaces of the bearings and the corresponding bearing surface of the outer ring.

SUMMARY OF THE INVENTION

An aim of the invention is to improve the lubrication of the various components in contact in a freewheel device.

Another aim of the present invention is to propose a freewheel device in which the occurrence of localized heating is prevented.

The freewheel device in accordance with the invention is of the type comprising an outer ring having an inner sliding path, an inner ring or a shaft having an outer sliding path, a freewheel disposed between the sliding path of the outer ring and the sliding path of the inner ring and comprising a plurality of cams disposed in windows in a cylindrical part of at least one cage and assuring unidirectional coupling between the outer and inner rings, and at least one bearing member disposed radially between the outer and inner rings for maintaining said outer and inner rings concentric. The bearing member has a radial part provided with at least two holes for circulation of lubricant. At least one hole is near the outer ring. This encourages circulation of the lubricant.

In one embodiment of the invention the holes are distributed around two circles concentric with the rotation axis of the bearing. There can be at least one other hole near the inner ring.

The holes can be regularly distributed in the circumferential direction.

In one embodiment of the invention the holes near the outer ring alternate with the other holes in the circumferential direction. They can equally be offset relative to the other holes in the circumferential direction.

At least one hole can open onto the outside of the cylindrical part of the cage and at least one hole can open onto the inside of the cylindrical part of the cage, respectively to encourage circulation of the lubricant between the cage and the outer ring and between the cage and inner ring.

Accordingly, the lubricant can circulate freely in the freewheel assembly with no pockets of stagnant lubricant. This reduces the temperature inside the assembly. Lubrication between the flanks of the cage and the inner radial walls of the bearings is improved. Lubrication between the outer radial walls of the bearings and adjoining parts such as friction discs or retaining flanges is improved by the increased number and improved distribution of lubricant exit points. The risk of binding between parts in rubbing contact and the noise level in operation are reduced.

The present invention will be better understood after reading the detailed description of one particular embodiment given by way of non-limiting example and shown in the accompanying drawings, in which:

BRIEF DESCRIPTION OF THE DRAWINGS

FIG. 2 is a side elevation view of a bearing member mounted in the freewheel device from FIG. 1.

DETAILED DESCRIPTION OF THE INVENTION

Figure 1:
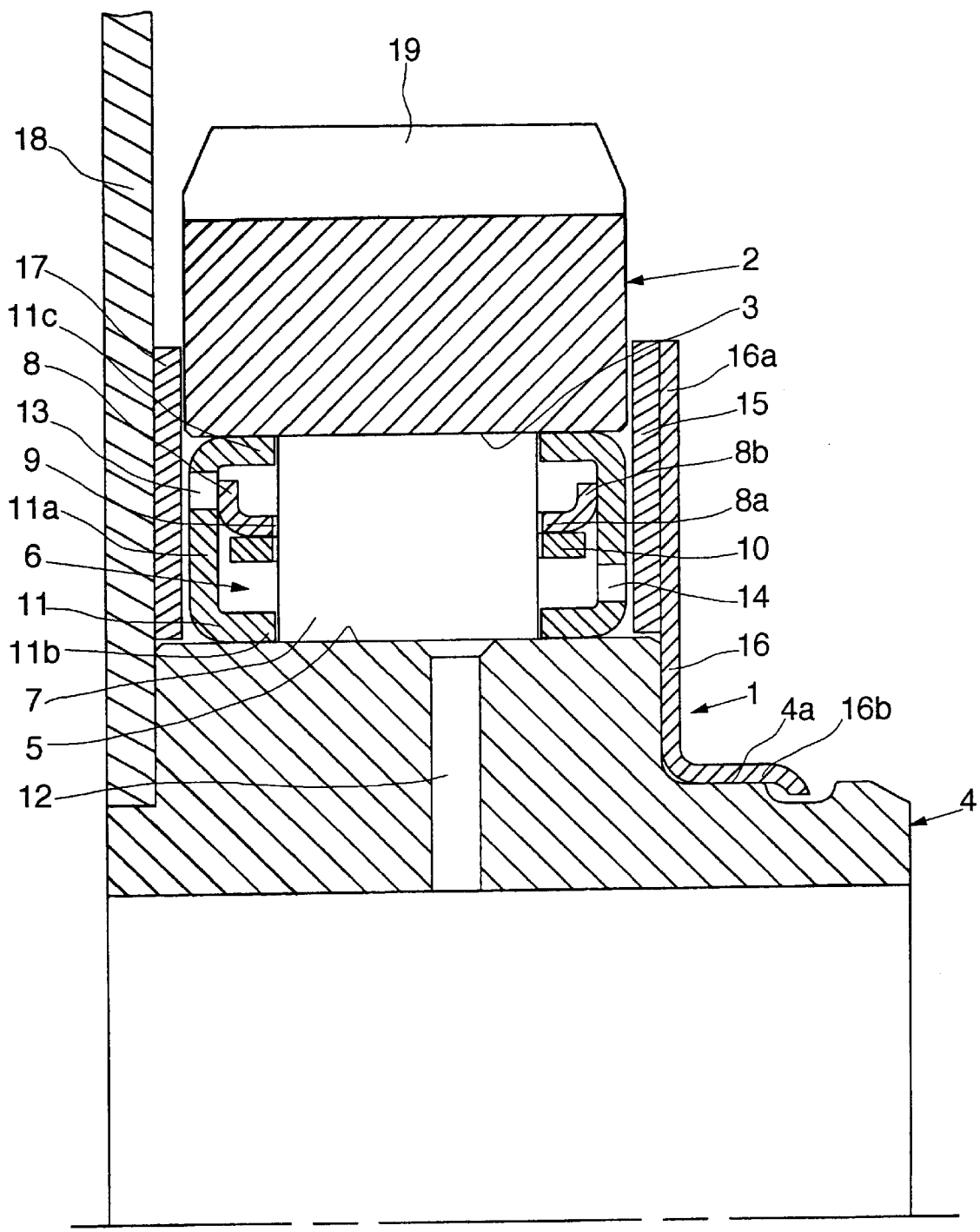
FIG. 1 is a half-view in axial section of a freewheel device in accordance with the invention.

As can be seen in the figures, the freewheel device 1 comprises an outer ring 2 with an inner sliding path 3 inside it, an inner ring 4 having an outer sliding path 5 on its cylindrical outside surface, and a freewheel 6. The freewheel 6 comprises a plurality of cams 7 between the sliding path 3 on the outer ring 2 and the sliding path 5 on the inner ring 4 and held by a cage 8 having a plurality of windows 9 regularly distributed in the circumferential direction in which the cams 7 are disposed. The cage 8 has an axial part 8a extended at both axial ends by two outwardly directed radial rims 8b. The freewheel 6 also comprises a leaf spring 10 adjacent the cage 8 on its inner side and pressing the cams 7 against the sliding paths 3 and 5.

Two identical and facing bearings 11 are disposed between the outer ring 2 and the inner ring 4 on each side of the freewheel 6. Each bearing 11 has a radial part 11a extended at its inner and outer edges by an inner axial part 11b and an outer axial part 11c. The inner axial part 11b is in rubbing contact with an outside cylindrical surface of the inner ring 4 adjacent the sliding path 5. Similarly, the outer axial part 11c is in rubbing contact with a bore of the outer ring 2 adjacent the sliding path 3. The two bearings 11 hold the outer ring 2 and inner ring 4 concentric and retain the freewheel 6 axially relative to said outer ring 2 and inner ring 4.

The inner ring 4 has at least one radial hole 12 for injecting lubricant into the freewheel 6. In the axial direction the hole 12 is level with the cams 7 and opens onto the sliding path 5.

The radial part 11a of each bearing 11 incorporates a plurality of holes 13 and 14 for evacuating the lubricant to the exterior of the freewheel 6. The holes 13 are on the same side as the outer ring 2 and are adjacent the outer axial part 11c. The holes 13 are radially between the axial part 8a of the cage 8 and the outer axial part 11c. In contrast, the holes 14 are on the same side as the inner ring 4 and are adjacent the inner axial part 11b, and are therefore radially between the cage 8 and said inner axial part 11b. The lubricant injected via the hole 12 and on the outside of the cage 8 can be evacuated via the holes 13 and the lubricant on the inside of the cage 8 can be evacuated via the holes 14.

As seen in FIG. 2 in particular, a flange 11 comprises two diametrally opposite holes 13 and two diametrally opposite holes 14, the holes 13 and 14 being regularly distributed in the circumferential direction. Alternatively, a different number of holes 13 and/or holes 14 could be provided, for example only one hole of each type, or a number greater than 2. The regular circumferential distribution of the various holes prevents localized weakening of the bearings 11 and assures better circulation of lubricant. Similarly, the fact that the holes 13 and the holes 14 alternate improves the circulation of lubricant. The holes 13 are all at the same distance from the axis of the bearing 11. Likewise the holes 14.

If the bearings 11 are machined by cutting away material, the holes 13 and 14 can be drilled in the conventional way. If, on the other hand, and in particular in the case of copper alloy bearings, the bearings are made by cutting and pressing sheet metal, the holes 13 and 14 can advantageously be punched, preferably in the sheet metal first blank.

On one side of the freewheel device 1 the bearing 11 is retained axially by a radial flange 15 in turn supported by a sheet metal component 16 having a radial part 16a in contact with the flange 15 and an axial part 16b force-fitted onto a cylindrical bearing surface 4a provided for this purpose on the inner ring 4.

The bearing 11 on the opposite side of the freewheel device 1 is retained by a flange 17 similar to the flange 15 and supported by a radial disc-support 18 part of which is shown in FIG. 1. The inner ring 4 is welded to the disc-support 18. The outer cylindrical surface of the outer ring 2 has a plurality of teeth 19 for transmitting torque to discs, not shown. The lubricant flowing through the holes 13 and 14 onto the outside of the freewheel 6 also provides lubrication between the retaining flanges 15 and 17 and the outside faces of the radial parts 11a of the bearings and between the retaining flanges and the lateral faces of the outer ring.

The invention improves the lubrication of the freewheel device, both inside and outside the cage, reduces areas in which the lubricant stagnates, reduces localized heating of the material of the various components described hereinabove, and reduces the risk of binding, which enhances the reliability of the device and extends its service life.

What is claimed is:

1. Freewheel device comprising an outer ring having an inner sliding path, an inner ring or a shaft having an outer sliding path, a freewheel disposed between the inner and outer sliding paths, the freewheel device further comprising a plurality of cams to assure unidirectional coupling between the outer and inner rings, at least one cage having a cylindrical part provided with windows in which the cams are arranged, and at least one bearing member disposed radially between the outer and inner rings for maintaining the outer and inner rings concentric, each bearing member having a radial part with an outer portion that is located radially further outside than the cage and an inner portion that is located radially further inside than the cage, at least one hole which is a through hole for circulation of lubricant being provided in a first bearing member and being located such that at least a portion of said at least one hole in the first bearing member extends in the outer portion of the radial part of the first bearing member, and said freewheel device including at least one other hole being located such that at least a portion of said one other hole extends in the inner portion of the radial part of said first bearing member or the inner portion of the radial part of a second bearing member.

2. Device according to claim 1, wherein each bearing member is provided in its radial part with at least two holes for circulation of lubricant, with the holes of each bearing member distributed around two circles concentric with respect to the rotation axis of the bearing member in which the holes are formed, such that at least a portion of a hole distributed on one circle is in the outer portion of the radial part and at least a portion of a hole distributed on another circle is in the inner portion of the radial part.

3. Device according to claim 2, wherein first and second bearing members are provided on opposite sides of said cam members, and wherein each bearing member has at least two through holes for lubricant circulation.

4. Device according to claim 3, wherein there are a plurality of holes on each of the two concentric circles with the holes on each circle being regularly distributed in the circumferential direction.

5. Device according to claim 3, wherein the at least one hole having at least a portion in the outer portion of the radial part in at least one of the first and second bearing members alternates in the circumferential direction with the at least one hole which has a portion in the inner-portion of the radial part in at least one of the first and second bearing members.

6. Device according to claim 2, wherein each hole having at least a portion in the outer portion of the radial part of at least one of the first and second bearing members is offset in the circumferential direction relative to each hole having at least a portion in the inner portion of the radial part of at least one of the first and second bearing members.

7. Device according to claim 1, wherein the at least one hole having at least a portion extending in the outer portion of the radial part of the first bearing member opens out to the radial outside of the cylindrical part of the cage.

8. Device according to claim 7, wherein at least a portion of the at least one other hole, extending in the inner portion of the radial part of said first bearing member or in a second bearing member, opens out to the radial inside of the cylindrical part of the cage.

9. Device according to claim 1, wherein at least a portion of the at least one other hole, extending in the inner portion of the radial part of said first bearing member or in a second bearing member, opens out to the radial inside of the cylindrical part of the cage.

10. Device according to claim 1, wherein, in said first bearing member, there are a plurality of holes having a portion in the outer portion of the radial part which alternate in the circumferential direction with a plurality of holes having a portion in the inner portion of the radial part of at least one of the first and second bearing members.

11. Device according to claim 2, wherein at least one hole of said first bearing member extending in the outer portion of the radial part of said first bearing member opens out to the outside of the cylindrical part of the cage.

12. Device according to claim 11, wherein at least a portion of the at least one hole extending in the inner portion of the radial part of said first bearing member or in a second bearing member, opens out to the inside of the cylindrical part of the cage.

13. Device according to claim 1, wherein said first bearing member includes a first pair of holes that are circumferentially spaced and provided in said outer portion and a second pair of holes that are circumferentially spaced and provided in said inner portion of said first bearing member.

14. Device according to claim 13, wherein said freewheel device includes the second bearing member and said second bearing member having a plurality of holes formed therein that are circumferentially offset from those in said first bearing member.

15. Freewheel device comprising an outer ring having an inner sliding path, an inner ring or a shaft having an outer sliding path, a freewheel disposed between the sliding path of the outer ring and the sliding path of the inner ring, the freewheel device further comprising a plurality of cams to assure unidirectional coupling between the outer and inner rings and at least one cage having a cylindrical part provided with windows in which the cams are arranged, and at least one bearing member disposed radially between the outer and inner rings for maintaining the outer and inner rings concentric, a first space portion being formed radially between the cage and the outer ring and a second space portion being formed between the inner ring and the cage, each bearing member having a radial part provided with at least one hole which is a through hole for circulation of lubricant, with at least one hole of said freewheel device being located such that lubricant is evacuated from the first space portion, and at least one other hole being located such that lubricant is evacuated from the second space portion.

16. Device according to claim 15, wherein each bearing member is provided in its radial part with at least two holes for circulation of lubricant, the lubricant being evacuated through holes that are distributed around two circles concentric with the rotation axis of the freewheel device, such that lubricant is circulated through at least a portion of a hole distributed on one circle and which opens into the first space, and lubricant is circulated through at least a portion of a second hole distributed on a second circle and which opens into the second space.

17. Device according to claim 16, wherein there are a plurality of holes arranged along each of the two circles that are regularly distributed in the circumferential direction.

18. Device according to claim 17, wherein lubricant circulates through the holes having a portion in the first space and also circulates through the holes having a portion in the second space, and the holes having a portion in the second space alternate with the holes having a portion in the first space in the circumferential direction.

19. Device according to claim 15, wherein there are a plurality of holes for circulating lubricant with respect to said first space and said second space, with the holes for circulating lubricant with respect to the first space being circumferentially offset relative to the holes circulating lubricant with respect to the second space.

20. Device according to claim 15, wherein at least a portion of said at least one hole which extends into the first space opens out onto the outside of the cylindrical part of the cage.

21. Device according to claim 18, wherein at least a portion of said at least one hole which extends into the second space opens out onto the inside of the cylindrical part of the cage.

22. Device according to claim 16, wherein lubricant circulates through holes provided on each circle with the holes in each circle being regularly distributed in the circumferential direction.

23. Device according to claim 15, wherein there are two bearing members provided on opposite sides of said cage, and the holes in each of the two bearing members are arranged such that lubricant circulates through the holes having a portion opening out in the first space and also circulates through the holes having a portion opening out in the second space which holes opening into the second space alternate with the holes having a portion in the first space in the circumferential direction.

24. Device according to claim 23, wherein the holes having a portion opening out in the first space are offset relative to the holes having a portion opening in the second space.

* * * * *